(12) United States Patent
Kottahachchi (10) Patent No.: US 8,738,923 B2
(45) Date of Patent: May 27, 2014

(54) FRAMEWORK FOR NOTIFYING A DIRECTORY SERVICE OF AUTHENTICATION EVENTS PROCESSED OUTSIDE THE DIRECTORY SERVICE

(75) Inventor: Buddhika Nandana Kottahachchi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1405 days.

(21) Appl. No.: 12/206,645

(22) Filed: Sep. 8, 2008

(65) Prior Publication Data

US 2009/0077645 A1 Mar. 19, 2009

Related U.S. Application Data

(60) Provisional application No. 60/972,591, filed on Sep. 14, 2007.

(51) Int. Cl.
*H04L 9/32* (2006.01)
*G06F 21/00* (2013.01)
*G06F 21/31* (2013.01)
*H04L 29/06* (2006.01)

(52) U.S. Cl.
CPC ............. *G06F 21/31* (2013.01); *H04L 9/3271* (2013.01); *H04L 63/0838* (2013.01)
USPC .............................................. 713/183; 726/9

(58) Field of Classification Search
CPC .... G06F 21/31; H04L 9/3271; H04L 63/0838
USPC ........................ 713/150, 182, 183; 726/2, 9
See application file for complete search history.

(56) References Cited

U.S. PATENT DOCUMENTS

| | | | | |
|---|---|---|---|---|
| 6,463,474 | B1 * | 10/2002 | Fuh et al. | 709/225 |
| 6,516,416 | B2 | 2/2003 | Gregg et al. | |
| 6,874,031 | B2 * | 3/2005 | Corbeil | 709/229 |
| 6,959,336 | B2 * | 10/2005 | Moreh et al. | 709/229 |
| 7,099,475 | B2 * | 8/2006 | Huff et al. | 380/270 |
| 7,165,182 | B2 * | 1/2007 | Excoffier et al. | 713/183 |
| 7,222,361 | B2 * | 5/2007 | Kemper | 726/4 |
| 7,290,288 | B2 | 10/2007 | Gregg et al. | |
| 7,921,290 | B2 * | 4/2011 | Albert et al. | 713/168 |
| 8,132,018 | B2 * | 3/2012 | Eldar et al. | 713/183 |
| 2005/0108579 | A1 * | 5/2005 | Isaacson et al. | 713/202 |
| 2005/0228981 | A1 * | 10/2005 | Gavrilov et al. | 713/100 |

OTHER PUBLICATIONS

Harrison, (RFC 4513, Jun. 2006).*
NIST Special Publication 800-63. Jun. 2004.*

* cited by examiner

*Primary Examiner* — Saleh Najjar
*Assistant Examiner* — Oleg Korsak
(74) *Attorney, Agent, or Firm* — Kilpatrick Townsend & Stoctkton LLP (57) ABSTRACT

Authenticating an end user for a client application using a directory service can include receiving end user identity information and security information at the client application, sending a search request to the directory service for an entry associated with the end user identity information and, if a match is found, receiving a authentication token from the directory service associated with the end user identity information. The received authentication token can be compared with the security information. If the authentication token matches the security information, sending a request to update the directory service to indicate that successful authentication of the end user has occurred and if the authentication token does not match the security information, sending a request to update the directory service to indicate that a failed attempt at authentication of the end user has occurred.

14 Claims, 4 Drawing Sheets

FRAMEWORK FOR NOTIFYING A DIRECTORY SERVICE OF AUTHENTICATION EVENTS PROCESSED OUTSIDE THE DIRECTORY SERVICE

CROSS-REFERENCES TO RELATED APPLICATIONS

The present application claims priority to Provisional Application No. 60/972,591, filed on Sep. 14, 2007, the disclosure of which is hereby incorporated by reference in its entirety for all purposes.

BACKGROUND OF THE INVENTION

The present invention relates to systems and methods for controlling access to software applications and associated data. More particularly the present invention relates to systems and methods for providing secure end user authentication for enterprise and other software applications.

An internet directory service is a software application, or a set of applications, that stores and organizes information about a computer network's users and network resources, and that allows network administrators to manage users' access to the resources. A directory service can be deployed as the central identity store in a multitude of enterprise deployments and can be used to perform end user authentication.

A popular mechanism for such end user authentication is based on determining if the end user knows the correct password associated with that user's account. One of the challenges with password based authentication is preventing a malicious user from guessing the password and attempts to do so are usually classified as "brute force" or "dictionary" attacks where a malicious entity will perform a series of authentication attempts providing different password values until success is achieved.

Some directory services support advanced mechanisms to mitigate such attacks by detecting consecutive failed login attempts and locking the account for a pre-determined time interval thereby reducing the likelihood of success by such an attack. For example, if a particular password can have $26^6$ or 308,915,776 possibilities (which is a 6 character password constructed using case-insensitive letters) and you locked out an account for a day after 3 consecutive failed logins that would require $(26^6)/3$ or 102,971,925 days to cover all possibilities. But if you didn't have such lock out mechanisms in place thus allowing unrestricted consecutive authentication attempts and each attempt took $\frac{1}{100}$ of a second it would take just under 36 days to try all possibilities.

A directory service is able to safeguard accounts contained within the directory from these attacks only if it is aware of the result of an authentication attempt. LDAP (lightweight directory access protocol) is a well known application protocol for querying and modifying directory services running over TCP/IP. In at least one known LDAP directory service, authentication attempts have been performed via LDAP bind operations where the client provides a cleartext password value to the directory service and the directory service evaluates its correctness internally and maintains the required state regarding successful or failed authentication attempts. Thus, in an LDAP bind operation the entire authentication process is performed within the directory service with appropriate internal events being generated to update various account states as necessary.

However, to address concerns regarding the propagation of a cleartext password over the Internet (even within a secure channel such as SSL) a new class of authentication mechanisms known as digest authentication has been proposed and has grown in popularity. The new class of authentication mechanisms can and often use LDAP search operation based authentication. In an LDAP search based authentication, authentication is performed against other authentication tokens (e.g., verifiers) maintained as part of a user entry where the token maybe retrieved by the application and the authentication process occurs within the application and outside the scope of the directory service. Therefore in LDAP search based authentications, the directory does not implicitly know the result of the authentication attempt. Based on the HTTP digest authentication mechanism, slightly varied versions are being adopted by other protocols.

Consider a simplified scenario on how a variant of an LDAP search based authentication is used by one known security product:

1. An end user provides his password to a client when attempting to access a database.
2. This password is converted into an irreversible format (a verifier) and transmitted to the database.
3. The database queries the directory service for the known verifier corresponding to the end user via an LDAP search operation.
4. The database compares the two (user provided and known) verifier values and determines whether authentication was a success or not.
5. Based on the result in 4, the end user is either granted or denied access to the database.

The comparison that occurs in step 4 occurs outside the directory service and therefore the directory service has no means to know the result of the comparison. What this means is that a malicious entity can launch an attack on a particular account via the client and the database while circumventing the protections afforded by the directory service against such attacks. Essentially, any mid-tier application performing end user authentication via verifiers by referring to a central identity store in the form of a directory service is susceptible to be exploited in this manner.

One mechanism that can be implemented to avoid this problem is for all mid-tier client applications to build logic that maintains their own state regarding authentication events and performs the necessary account lockouts. Such an approach is not desirable in some instances. Accordingly, additional techniques of providing a secure mechanism for a client to inform a directory service of the authentication results when authentication is performed within the client are desirable.

BRIEF SUMMARY OF THE INVENTION

Embodiments of the invention address the foregoing and other such problems by providing a framework in which authentication can be performed within a client application while enabling authentication control policies present in a directory service to provide protections against improper access to end user accounts.

According to one embodiment of the invention, a method of authenticating an end user for a client application using a directory service having an authentication control policy that tracks failed authentication attempts and allows lock out of an account after a predetermined number of failures comprises: receiving end user identity information and security information at the client application; sending a search request to the directory service for an entry associated with the end user identity information and, if a match is found, receiving an authentication token from the directory service associated with the end user identity information; comparing the received authentication token with the security information; if the authentication token matches the security information, sending a request to update the directory service to indicate that successful authentication of the end user has occurred; and if the authentication token does not match the security information, sending a request to update the directory service to indicate that a failed attempt at authentication of the end user has occurred.

According to another embodiment of the invention, a method of authenticating a user for a client application using a directory service having an authentication control policy that tracks failed authentication attempts and allows lock out of an account after a predetermined number of failures comprises: receiving a search request including user identity information at the directory service; comparing the user identity information with entries in the directory service; if a match is found, sending an authentication token associated with the user identity information to a client application; and receiving a request at the directory service to update the directory service with information that indicates whether successful authentication of the user occurred at the client application.

In another embodiment, a machine-readable medium for a computer system is provided. The machine-readable medium has stored thereon a series of instructions which, when executed by a processing component of the computer system, cause the processing component to attempt authentication of a user for a client application over the Internet with a directory service that implements an authentication control policy to track failed authentication attempts by: receiving account identity information and security information at the client application; sending a search request comprising the account identity information to the directory service; receiving an authentication token from the directory service associated with the account identity information if an entry associated with the account identity information exists on the directory service; comparing the received authentication token with the security information; and sending a request to update the directory service to indicate that a failed attempt at authentication of the end user has occurred if the authentication token does not match the security information.

In still another embodiment of the invention, a computer processing system comprises a directory service having an authentication control policy that tracks failed authentication attempts and allows lock out of an account after a predetermined number of failures, the directory service adapted to (i) receive a search request including user identity information; (ii) compare the user identity information with entries in the directory service; (iii) send an authentication token associated with the user identity information to a client application if a match is found; and (iv) receive a request at the directory service to update the directory service with information that indicates whether successful authentication of the user occurred at the client application.

A further understanding of the nature and advantages of the inventions disclosed herein may be realized by reference of the remaining portions of the specification and the attached drawings.

BRIEF DESCRIPTION OF THE DRAWINGS

Various embodiments in accordance with the present invention will be described herein with reference to the drawings, in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide a method, system and machine-readable media for addressing the deficiencies in previously known systems mentioned above. Specifically, embodiments of the invention provide a method, system and machine-readable media for authenticating an end user for a client application referencing a directory service in which authentication occurs within the client application outside the scope of the directory service. Thus, cleartext passwords need not be passed from the application to the directory service. Instead, authentication tokens (e.g., account verifier information such as a hash of a user password) for a user account can be retrieved by the client application from the directory service and compared to account security information (e.g., a hash of the user's password) received by the client application directly from the user through a front end application such as a web browser. Embodiments of the invention pass results of authentication attempts within the client application to the directory service to enable the use of authentication control policies within the directory service to track failed authentication attempts and enforce security policies, such as lock out of an account after a predetermined number of failures.

Figure 1:
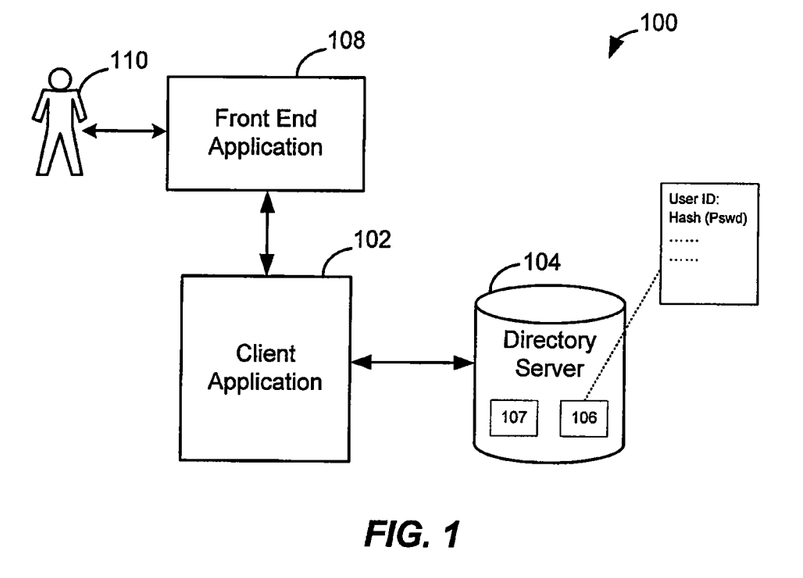
FIG. 1 illustrates and exemplary run time environment of an authentication system according to one embodiment of the invention.

In order to better understand and appreciate the present invention reference is made to FIG. 1, which illustrates and exemplary run time environment of an authentication system 100 according to one embodiment of the invention. This figure, in conjunction with FIG. 2, which is a flow chart depicting steps associated with an authentication method 200 in accordance with one embodiment of the invention, is presented to provide an overview on how a client application interacts with a directory service to address the authentication process according to one embodiment of the invention.

As shown in FIG. 1, authentication system 100 includes a client application 102 which references a directory service 104 as a central repository of information necessary for an authentication process over a network such as the Internet. Client application 102 can be any application that relies on user accounts to control access to data within the client application itself or within other applications or databases (not shown) accessible to the client application. For exemplary purposes only, in some embodiments, client application 102 can be a database application; a customer relationship management (CRM) application; an enterprise resource planning (ERP) application such as a supply chain management or supply chain planning application; a human resources management application; a learning management application; a corporate performance, financial and/or daily business management application, or the like.

Directory service 104 is a software application, or a set of applications that stores, among other information, identity management information necessary to authenticate users onto client application 102. Identity management information includes user identity information, user security information and account state information. User identity information may be, for example, a user name or email address. User security information may be a password, a token such as an RSA SecurID token or biometric information such as a fingerprint or retina scan, as well as other forms of known security information. Identity management information is stored as entries 106 within the directory service and can be accessed by client application 102 according to a predefined protocol. In one embodiment, directory service 104 can be accessed in accordance with a widely accepted and implemented LDAP (light weight directory access protocol). In some applications directory service 104 will reside on a single computer while in other applications the directory service is a readily scalable application that may be distributed across multiple data centers and locations. In some embodiments directory service 104 is an enterprise directory which acts as a central repository of user information for multiple applications in a distributed environment.

In addition to storing identity management information, directory service 104 contains a set of authentication control policies 107 that can be implemented to mitigate risks associated with a malicious or otherwise unauthorized user trying to log onto and access client application 102 and maintains account state information in order to implement the control policies. A typical authentication control policy defines the number of unsuccessful logon attempts that can be tried within a specified period of time before directory service 104 locks out a user's account on either a permanent or temporary basis. The lockout period itself can also be defined within the control policy. As illustrative examples, one particular control policy may lock a user out of an account for a twenty four hour period after five unsuccessful login attempts. Another authentication control policy may permanently lock a user out of an account after five unsuccessful login attempts requiring intervention by an administrator to reset the account and password to allow for future logins. These and/or other authentication control policies can be implemented by directory service 104 in different embodiments of the invention. The account state information is kept for each user entry in the directory service and allows directory service 104 to track information such as the number of failed authentication attempts for a particular user, the time between failed authentication attempts or the actual time of the last X failed authentication attempts and other information that is necessary to implement the authentication control policies of the directory server.

Also shown in FIG. 1 is front end application 108 such as a web browser, command line interface, email client or other application that allows an end user 110 to interact with client application 102. Prior to using certain features of client application 102, end user 110 must be authenticated to the client application. An authentication request may be initiated when an end user attempts to logon to a client application 102 through front end application 108.

Figure 2:
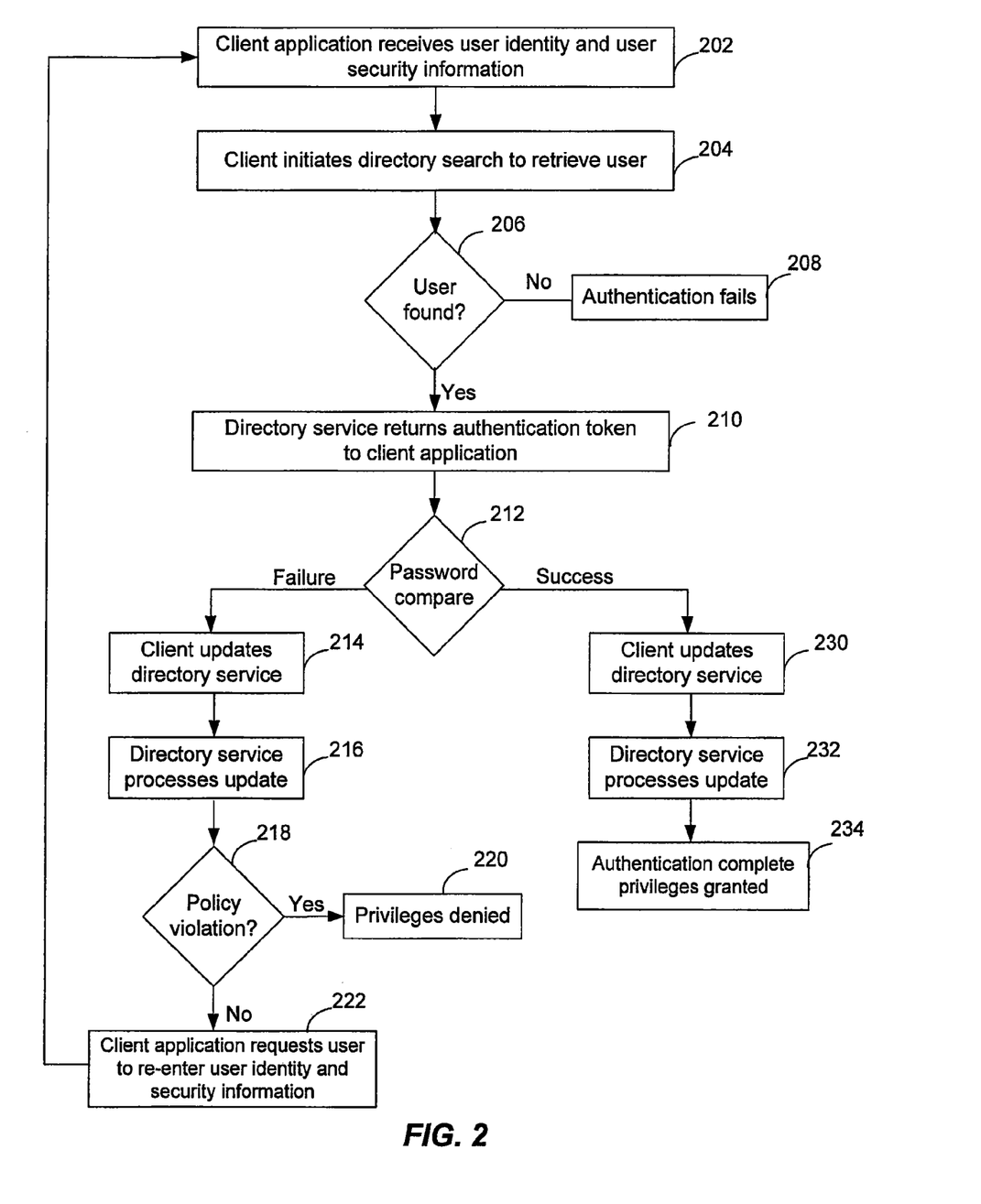
FIG. 2 is a flow chart depicting steps associated with an authentication method in accordance with the embodiment of the invention shown in FIG. 1.

Referring now to FIG. 2, at logon client application 102 requests and receives user identity and user security information from user 110 via front end application 108 (step 202). After receiving the user identity and security information, application 102 searches directory service 104 to retrieve authentication information for the user (step 204). A search of the directory service may be done by passing the user identity information to directory service 104 by an operation defined in the protocol used to interact with the directory service. For example, in an LDAP directory service a search operation may be performed by an LDAP Search operation. Directory service 104 then searches the entries stored therein to determine if an entry matches the user identity information (step 206). If no match is found, the authentication request fails (step 208) and client application 102 can report back to end user 110 that the identity information submitted by the user is not recognized by the application.

If a match for the user identity information is found in directory service 104, the directory service returns an authentication token to the client application (step 210). For security purposes (e.g., to prevent cleartext passwords from being sent across a network) in some embodiments the authentication token is a hash value (one-way function) of the user security information. Thus, if the security information is a password, the authentication token may be a number generated by running the password through a one-way hash function. Similarly, if the identity information is a fingerprint scan, the authentication token may be a number generated by running data representing the fingerprint scan through a one-way hash function. In some embodiments directory service 104 stores the security information (e.g., cleartext password) for the end user and generates the authentication token using the one-way hash function from the password prior to sending the token to application 102. In other embodiments directory service 104 generates the authentication token (hashed version of the user's security information) when the user entry is initially populated with security information or when such security information is subsequently modified and thus stores the authentication token directly in entry 106 for the end user providing an additional level security.

Client application 102 then compares the retrieved authentication token with the security information received from front end application 108 in step 204 to determine if authentication is successful or not (step 212). Prior to the comparison the security information is put through the same hash function used to generate the authentication token. Such hashing can be done within application 108 in which step 202 sends the hashed version of the security information to client application 102 or within client application 102 in which case the unhashed version is sent in step 202.

If the comparison in step 212 is successful, client application 102 transmits a message to update directory service 104 to indicate that successful authentication of the end user has occurred (step 230). Directory service 104 receives and processes the message and updates appropriate account state information for the entry associated with the user account (step 232). The message sent to update the directory service in step 214 updates account state information in the entry associated with the particular user identity using a message format defined in the directory service access protocol. For example, in an LDAP directory service the update may be performed by an LDAP Modify operation. The update in step 216 may include, for example, setting an account state variable that tracks status of the last authentication attempt to "successful", resetting the count of failed authentication attempts to zero, clearing data associated with tracking the time of previous unsuccessful authentication attempts and the like. The actual updates performed to the account state information will depend on the type of information tracked by directory service 104 and the control policies implemented by the directory service.

After a successful authentication, user 110 is granted access to client application 102 according to whatever access privileges the user has. In some embodiments the user's access privileges are stored in directory server 104 as part of the entry for the user and passed to application 102 after user 110 has been successfully authenticated. In other embodiments, the access privileges are stored in a separate database (not shown) that is accessed by application 102 upon authentication.

If the comparison in step 214 is unsuccessful, client application transmits a message that updates the directory service to indicate the unsuccessful authentication attempt (step 214). Directory service 104 receives and processes the message and updates appropriate account state information for the entry associated with the user account (step 216). As with step 230, the message sent to update the directory service in step 214 updates account state information in the entry associated with the particular user identity using a message format defined in the directory service access protocol. Update step 216 may include, for example, setting a variable that tracks status of the last authentication attempt to "unsuccessful", increasing the count of failed authentication attempts by one, setting data associated with tracking the time of previous unsuccessful authentication attempts and the like.

After updating the account state information, directory server 104 determines if its authentication control policy has been violated (step 218). This is done by comparing account state information relevant to access policy rules associated with the directory service. As discussed above, a policy violation may occur, for example, when a predetermined number of consecutive failed authentication attempts is reached for the directory service account for user 110. If a policy violation occurs, the directory service implements rules associated with the access policy (e.g., lock out account for 24 hours) for the particular violation (step 220). If no policy violation has occurred, client application 102 can request user 110 to reenter the user identity and security information for another attempt to authenticate the user.

In one particular implementation of the present invention directory service 104 is the Oracle Internet Directory (OID). OID is an LDAP server. In this implementation, messages sent by application 102 conform with the standard LDAP protocol which means any client that can communicate via LDAP is able to benefit from the techniques of the invention.

OID has the ability to check and enforce account state policies at authentication time. This is enabled through the following custom control:

```
AccountStatusRequestControl
   AccountStatusRequestControl
      ::= SEQUENCE {
         controlType      2.16.840.1.113894.1.8.16,
         criticality      BOOLEAN DEFAULT FALSE,
      }
```

When packaged with the LDAP search operation associated with the authentication process, the Oracle Internet Directory will process this control and cause the generation of a response control. The actual response control depends on the type of situation the server wants the client to be aware of and cases like imminent password expiration, number of grace logins remaining, password expired, account locked etc. are handled. By being aware of situations like imminent password expiration, password expiration, grace login usage and directing the end user to password modification as part of application workflow administrative burden can be significantly reduced while enhancing the end user experience. The application can then parse and enforce the results.

While this addresses the issue of how the policies can be enforced by the client application, another fundamental application requirement is the ability to inform the directory of authentication success/failure. The Oracle Internet Directory enables this via the following virtual attribute:

orclAccountStatusEvent which is added on the LDAP "top" object class which by object class definition inheritance is available on all user account entries. The orclaccountstatusevent attribute is implemented as a "virtual attribute" which has no disk footprint. Since the value of the attribute is only useful at the time of change, its persistence would place unnecessary storage burden on the deployment.

The use of the orclaccountstatusevent attribute is protected via an authorization access control directive that prevents all but authorized application entities from being able to modify this attribute. Thus, a mid-tier client application wishing to benefit from this invention can do so by performing a standard LDAP modify operation on the "orclaccountstatusevent" with the value corresponding to the event.

By default a directory ships with access to this attribute being restricted to all. Therefore an application wishing to utilize this mechanism may need the directory admin to grant its application identity write access on the attribute for the relevant user population.

The authentication success/failure is communicated to the directory via modification of this attribute to hold <UserAccountEvent>. The following LDIF illustrates this.

```
dn: <UserDN>
changetype: modify
replace: orclAccountStatusEvent
orclAccountStatusEvent: <UserAccountEvent>
```

The Oracle Internet Directory understands the following relevant events:

```
UserAccountEvent = 1 (Authentication Success)
UserAccountEvent = 2 (Authentication Failure)
```

Upon receipt of these events, the Oracle Internet Directory invokes the same logic that is invoked during an authentication/success failure that occurs during an LDAP bind or compare operation, thereby updating the necessary account states.

Thus, an application developer can leverage the existing account state related infrastructure available in the Oracle Internet Directory to secure his own application without the cost of rebuilding the same functionality.

The OID Server is instrumented to facilitate this as follows:
1. Detect changes to the orclaccountstatusevent attribute on a given user entry.
2. Determine if the application entity performing the change operation had permissions to do so—ignore change if not.
3. Examine the value being passed in to determine if it describes a known event (e.g., 1 for authentication success and 2 for failure)—ignore if not.
4. Process the event (i.e., update counters and state as necessary).
5. Do not write change to disk.
6. Return the conventional status for a successful LDAP modify operation.

This implementation leverages OID's authorization control infrastructure to ensure that a malicious entity can't communicate bogus authentication events to the Directory: Thus a malicious entity cannot send bogus "authentication failure"

events to OID thereby causing account lockout and end user Denial of service, and cannot send bogus "authentication success" events to prevent an account from being locked out during a "brute force"/"dictionary" attack.

Some additional advantages of various embodiments of the invention include:
1. This solution provides a central account state maintained in OID which means that a malicious entity cannot attack an account via different clients (for example, if one client (ex. the database) locks him out he can't continue his attack through another (webmail) client).
2. It removes the burden of account state maintenance from the client applications, thereby allowing them to focus on their own functionality and delegate identity related tasks to OID.
3. If they use the directory as their identity store, they already communicate with it via LDAP and the marginal cost of consuming this solution is very low.
4. It provides a secure mechanism that addresses concerns about bogus event propagation by malicious entities.
5. No additional burden in the form of storage requirements is placed on the Directory service.

Figure 3:
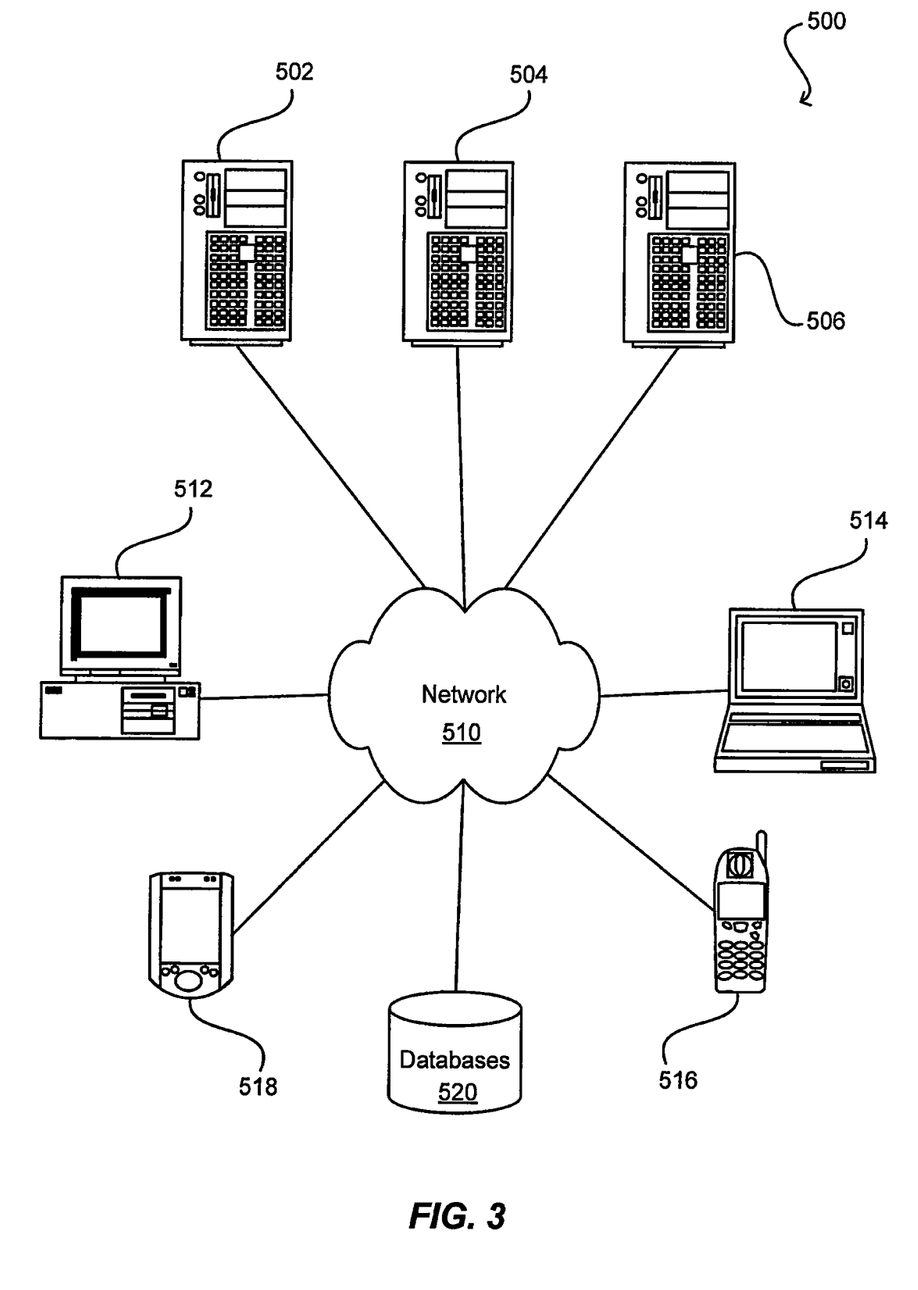
FIG. 3 illustrates components of an exemplary system environment that can be used in accordance with one embodiment of the present invention.

FIG. 3 is a block diagram illustrating components of an exemplary system environment in which various embodiments of the present invention may be implemented. The system 500 includes one or more user computers, computing devices, or processing devices 512, 514, 516, 518, which are used to operate front end application 108, such as a web browser, and client application 102. User computers 512, 514, 516, 518 may be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of software applications stored therein. Alternatively, user computers 512, 514, 516, 518 may be any other electronic device, such as a thin-client computer, Internet-enabled gaming system, and/or personal messaging device, capable of communicating via a network (e.g., network 510 described below) and/or displaying and navigating Web pages or other types of electronic documents. Although exemplary system environment 500 is shown with four user computers, any number of user computers may be supported.

In most embodiments, system environment 500 includes some type of network 510. Network 510 may be any type of network familiar to those skilled in the art that can support data communications using any of a variety of commercially-available protocols, including without limitation TCP/IP, SNA, IPX, AppleTalk, and the like. Merely by way of example, network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 also includes one or more server computers 502, 504, 506 which may be general purpose computers, specialized server computers (including, merely by way of example, PC servers, UNIX servers, mid-range servers, mainframe computers rack-mounted servers, etc.), server farms, server clusters, or any other appropriate arrangement and/or combination. In various embodiments, one or more of the servers 502, 504, 506 are dedicated to running directory service 104 described in the foregoing disclosure.

Each server 502, 504, 506 may run an operating system including any of those discussed above, as well as any commercially-available server operating systems. Servers 502, 504, 506 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 500 may also include one or more databases 520. The databases 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via network 510) with one or more of these. In a particular set of embodiments, databases 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, databases 520 may be relational databases, such as Oracle 10g that are adapted to store, update, and retrieve data in response to SQL-formatted commands.

Figure 4:
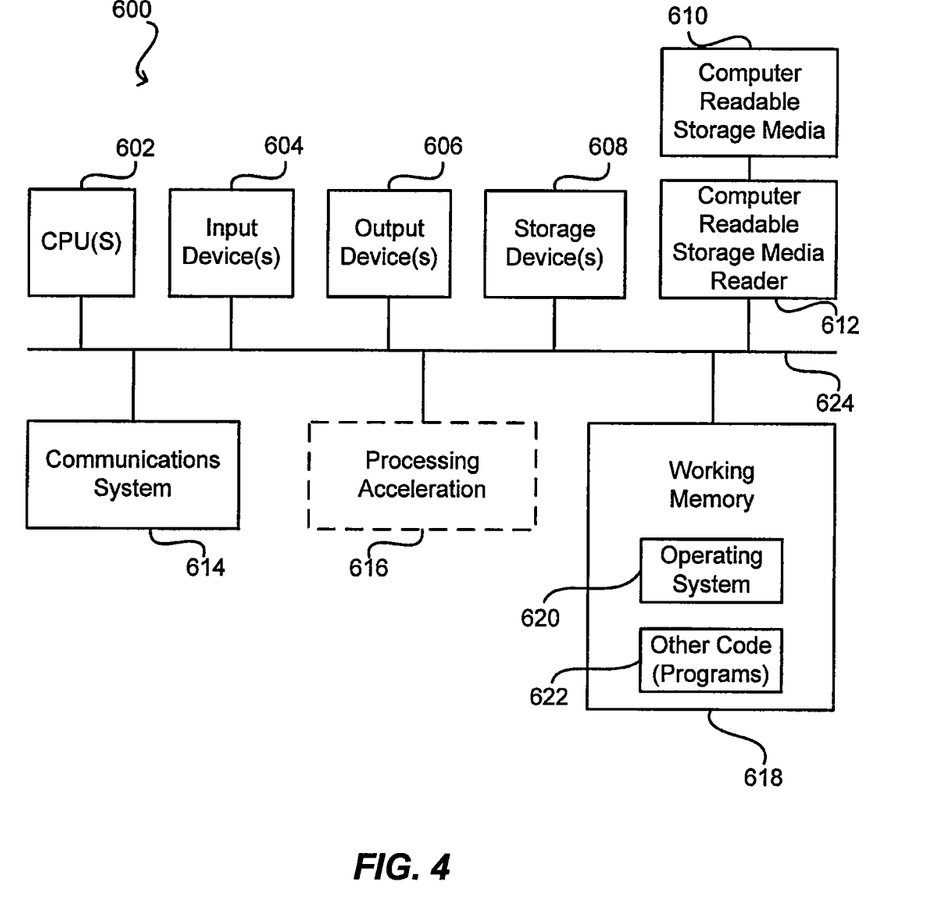
FIG. 4 illustrates components of a computerized device that can be used in accordance with one embodiment of the present invention.

FIG. 4 illustrates an exemplary computer system 600, in which various embodiments of the present invention may be implemented and/or which may be representative of one or more of computers 512, 514, 516, 518. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 may include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system environment 500.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of authenticating an end user for a client application using a directory service having an authentication control policy that tracks failed authentication attempts and allows lock out of an account after a predetermined number of failures, the method comprising:
   receiving, by a computer system executing the client application, end user identity information and security information at the client application from a front end application, wherein a hashing function has been applied to the security information by the front end application;
   sending, from the computer system executing the client application, a search request to the directory service for an entry associated with the end user identity information, the search request including at least some of the user identity information but not including the security information;
   receiving, by the computer system executing the client application, a authentication token from the directory service associated with the end user identity information, wherein the authentication token received from the directory service is generated by the same hashing function as applied to the security information by the front end application;
   comparing, by the computer system executing the client application, the received authentication token with the security information;
   if the authentication token matches the security information, sending, from the computer system executing the client application, a request to update the directory service to indicate that successful authentication of the end user has occurred; and
   if the authentication token does not match the security information, sending, from the computer system executing the client application, a request to update the directory service to indicate that a failed attempt at authentication of the end user has occurred.

2. The method of claim 1 wherein the end user information is a username and the security information is generated by hashing a cleartext password entered by the end user.

3. The method of claim 2 wherein the authentication token stored in the directory service is generated by hashing a password associated with the end user using the same hash function that is used to generate the security information received at the client application.

4. The method of claim 1 wherein the directory service:
   in response to receiving a request indicating a successful authentication attempt, resets a count associated with a number of failed attempts to zero; and
   in response to receiving a request indicating a failed authentication attempt, increases the count associated with the number of failed attempts by one and, if the number of failed attempts exceeds a predetermined number of allowed failures, locks out the account associated with the end user.

5. The method of claim 1 wherein the authentication token is a hashed value of a text-based password and authentication of an end user occurs without sending a cleartext password to the directory service.

6. The method of claim 5 wherein the directory service is an LDAP (light directory access protocol) server, the search request is an LDAP Search operation and the requests to update the directory service to indicate successful or failed authentication attempts are LDAP Modify operations on an LDAP Entry within the directory service associated with the end user.

7. A non-transitory computer-readable medium comprising a series of instructions stored thereon which, when executed by a processing component of a computer system, cause the processing component to attempt authentication of a user for a client application over the Internet with a directory service that implements an authentication control policy to track failed authentication attempts by:
   receiving, by a computer system executing the client application, account identity information and security information at the client application;
   sending, from the computer system executing the client application, a search request comprising the account identity information to the directory service, the search request including at least some of the user identity information but not including the security information;
   receiving, by the computer system executing the client application, an authentication token from the directory service associated with the account identity information if an entry associated with the account identity information exists on the directory service;
   comparing, by the computer system executing the client application, the received authentication token with the security information; and
   sending, by the computer system executing the client application, a request to update the directory service to indicate that a failed attempt at authentication of the end user has occurred if the authentication token does not match the security information.

8. The non-transitory computer-readable medium set forth in claim 7 wherein the series of instructions further causes the processing component to send a request to update the directory service to indicate that successful authentication of the end user has occurred if the authentication token matches the security information.

9. A system comprising:
  a processor; and
  a memory coupled with and readable by the processor and comprising a set of instructions stored therein which, when executed by the processor, causes the processor to authenticate an end user for a client application using a directory service having an authentication control policy that tracks failed authentication attempts and allows lock out of an account after a predetermined number of failures by:
    receiving, by a computer system executing the client application, end user identity information and security information at the client application from a front end application, wherein a hashing function has been applied to the security information by the front end application;
    sending, from the computer system executing the client application, a search request to the directory service for an entry associated with the end user identity information, the search request including at least some of the user identity information but not including the security information;
    receiving, by the computer system executing the client application, a authentication token from the directory service associated with the end user identity information, wherein the authentication token received from the directory service is generated by the same hashing function as applied to the security information by the front end application;
    comparing, by the computer system executing the client application, the received authentication token with the security information;
    if the authentication token matches the security information, sending, from the computer system executing the client application, a request to update the directory service to indicate that successful authentication of the end user has occurred; and
    if the authentication token does not match the security information, sending, from the computer system executing the client application, a request to update the directory service to indicate that a failed attempt at authentication of the end user has occurred.

10. The system of claim 9 wherein the end user information is a username and the security information is generated by hashing a cleartext password entered by the end user.

11. The system of claim 10 wherein the authentication token stored in the directory service is generated by hashing a password associated with the end user using the same hash function that is used to generate the security information received at the client application.

12. The system of claim 9 wherein the directory service:
  in response to receiving a request indicating a successful authentication attempt, resets a count associated with a number of failed attempts to zero; and
  in response to receiving a request indicating a failed authentication attempt, increases the count associated with the number of failed attempts by one and, if the number of failed attempts exceeds a predetermined number of allowed failures, locks out the account associated with the end user.

13. The system of claim 9 wherein the authentication token is a hashed value of a text-based password and authentication of an end user occurs without sending a cleartext password to the directory service.

14. The system of claim 13 wherein the directory service is an LDAP (light directory access protocol) server, the search request is an LDAP Search operation and the requests to update the directory service to indicate successful or failed authentication attempts are LDAP Modify operations on an LDAP Entry within the directory service associated with the end user.

* * * * *

UNITED STATES PATENT AND TRADEMARK OFFICE
CERTIFICATE OF CORRECTION

| | | |
|---|---|---|
| PATENT NO. | : 8,738,923 B2 | Page 1 of 1 |
| APPLICATION NO. | : 12/206645 | |
| DATED | : May 27, 2014 | |
| INVENTOR(S) | : Kottahachchi | |

It is certified that error appears in the above-identified patent and that said Letters Patent is hereby corrected as shown below:

Title Page, Item (74) under Attorney, Agent or Firm, delete "Stoctkton LLP" and insert -- Stockton LLP --.

Signed and Sealed this
Nineteenth Day of May, 2015

Michelle K. Lee
*Director of the United States Patent and Trademark Office*